(12) United States Patent
Gulati

(10) Patent No.: US 8,571,033 B2
(45) Date of Patent: *Oct. 29, 2013

(54) SMART ROUTING BETWEEN PEERS IN A POINT-TO-POINT LINK BASED SYSTEM

(75) Inventor: Manu Gulati, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 271 days.

This patent is subject to a terminal disclaimer.

(21) Appl. No.: 13/088,341

(22) Filed: Apr. 16, 2011

(65) Prior Publication Data

US 2011/0188504 A1 Aug. 4, 2011

Related U.S. Application Data

(63) Continuation of application No. 10/421,988, filed on Apr. 23, 2003, now Pat. No. 7,979,573, which is a continuation-in-part of application No. 10/356,324, filed on Jan. 31, 2003, now Pat. No. 7,346,078.

(60) Provisional application No. 60/380,740, filed on May 15, 2002, provisional application No. 60/419,031, filed on Oct. 16, 2002.

(51) Int. Cl.
*H04L 12/56* (2011.01)

(52) U.S. Cl.
USPC ........... 370/392; 709/217; 709/238; 709/246; 709/247

(58) Field of Classification Search
USPC .................. 709/203, 231, 236, 238, 245, 246
See application file for complete search history.

(56) References Cited

U.S. PATENT DOCUMENTS

| | | | |
|---|---|---|---|
| 6,678,740 B1 * | 1/2004 | Rakib et al. | 709/247 |
| 6,711,152 B1 * | 3/2004 | Kalmanek et al. | 370/351 |
| 7,089,293 B2 * | 8/2006 | Grosner et al. | 709/217 |
| 2003/0009585 A1 * | 1/2003 | Antoine et al. | 709/238 |
| 2006/0020715 A1 * | 1/2006 | Jungck | 709/246 |

* cited by examiner

*Primary Examiner* — Barbara Burgess
(74) *Attorney, Agent, or Firm* — Garlick & Markison; Jessica W. Smith

(57) ABSTRACT

Smart routing between peers in a point-to-point link based system begins when a device of a plurality of devices in a point-to-point link interconnected system receives a packet from an upstream link or a downstream link. The processing continues when the device interprets the packet to determine a destination of the packet. If the device is the destination of the packet, the device accepts the packet. If, however, the device is not the destination of the packet, the device forwards the packet on another upstream link or another downstream link without alteration of at least one of: source information of the packet and destination information of the packet.

20 Claims, 8 Drawing Sheets processing system 10 processing system 20 processing system 30 data mapping for I/O modules 62, 64, 70, and/or 72

SMART ROUTING BETWEEN PEERS IN A POINT-TO-POINT LINK BASED SYSTEM

CROSS REFERENCE TO RELATED PATENTS

The present U.S. Utility patent application claims priority pursuant to 35 U.S.C. §120, as a continuation, to U.S. Utility patent application Ser. No. 10/421,988, entitled "SMART ROUTING BETWEEN PEERS IN A POINT-TO-POINT LINK BASED SYSTEM," filed Apr. 23, 2003, pending, which claims priority under 35 USC §120 as a continuation-in-part of U.S. Utility patent application Ser. No. 10/356,324, filed Jan. 31, 2003, issued as U.S. Pat. No. 7,346,078; and claims priority pursuant to 35 U.S.C. §119(e) to the following U.S. Provisional Patent Applications:

U.S. Provisional Application Ser. No. 60/380,740, entitled "SYSTEM ON CHIP FOR NETWORKING," filed May 15, 2002, expired; and U.S. Provisional Application Ser. No. 60/419,031, entitled "PROCESSING OF RECEIVED DATA WITHIN A MULTIPLE PROCESSOR DEVICE," filed Oct. 16, 2002, abandoned.

all of which are incorporated herein by reference in their entirety and made part of the present U.S. Utility Patent Application for all purposes.

BACKGROUND OF THE INVENTION

1. Technical Field of the Invention

The present invention relates generally to data communications and more particularly to high-speed wired data communications.

2. Description of Related Art

As is known, communication technologies that link electronic devices are many and varied, servicing communications via both physical media and wirelessly. Some communication technologies interface a pair of devices, other communication technologies interface small groups of devices, and still other communication technologies interface large groups of devices.

Examples of communication technologies that couple small groups of devices include buses within digital computers, e.g., PCI (peripheral component interface) bus, ISA (industry standard architecture) bus, an USB (universal serial bus), SPI (system packet interface) among others. One relatively new communication technology for coupling relatively small groups of devices is the HyperTransport (HT) technology, previously known as the Lightning Data Transport (LDT) technology (HyperTransport I/O Link Specification "HT Standard"). The HT Standard sets forth definitions for a high-speed, low-latency protocol that can interface with today's buses like AGP, PCI, SPI, 1394, USB 2.0, and 1 Gbit Ethernet as well as next generation buses including AGP 8x, Infiniband, PCI-X, PCI 3.0, and 10 Gbit Ethernet. HT interconnects provide high-speed data links between coupled devices. Most HT enabled devices include at least a pair of HT ports so that HT enabled devices may be daisy-chained. In an HT chain or fabric, each coupled device may communicate with each other coupled device using appropriate addressing and control. Examples of devices that may be HT chained include packet data routers, server computers, data storage devices, and other computer peripheral devices, among others.

Of these devices that may be HT chained together, many require significant processing capability and significant memory capacity. Thus, these devices typically include multiple processors and have a large amount of memory. While a device or group of devices having a large amount of memory and significant processing resources may be capable of performing a large number of tasks, significant operational difficulties exist in coordinating the operation of multiple processors. While each processor may be capable of executing a large number operations in a given time period, the operation of the processors must be coordinated and memory must be managed to assure coherency of cached copies. In a typical multi-processor installation, each processor typically includes a Level 1 (L1) cache coupled to a group of processors via a processor bus. The processor bus is most likely contained upon a printed circuit board. A Level 2 (L2) cache and a memory controller (that also couples to memory) also typically couples to the processor bus. Thus, each of the processors has access to the shared L2 cache and the memory controller and can snoop the processor bus for its cache coherency purposes. This multi-processor installation (node) is generally accepted and functions well in many environments.

However, network switches and web servers often times require more processing and storage capacity than can be provided by a single small group of processors sharing a processor bus. Thus, in some installations, a plurality processor/memory groups (nodes) is sometimes contained in a single device. In these instances, the nodes may be rack mounted and may be coupled via a back plane of the rack. Unfortunately, while the sharing of memory by processors within a single node is a fairly straightforward task, the sharing of memory between nodes is a daunting task. Memory accesses between nodes are slow and severely degrade the performance of the installation. Many other shortcomings in the operation of multiple node systems also exist. These shortcomings relate to cache coherency operations, interrupt service operations, etc.

While HT links provide high-speed connectivity for the above-mentioned devices and in other applications, they are inherently inefficient in some ways. For example, in a "legal" HT chain, one HT enabled device serves as a host bridge while other HT enabled devices serve as dual link tunnels and a single HT enabled device sits at the end of the HT chain and serves as an end-of-chain device (also referred to as an HT "cave"). According to the HT Standard, all communications must flow through the host bridge, even if the communication is between two adjacent devices in the HT chain. Thus, if an end-of-chain HT device desires to communicate with an adjacent HT tunnel, its transmitted communications flow first upstream to the host bridge and then flow downstream from the host bridge to the adjacent destination device. Such communication routing, while allowing the HT chain to be well managed, reduces the overall throughput achievable by the HT chain, increases latency of operations, and reduces concurrency of transactions.

Applications, including the above-mentioned devices, that otherwise benefit from the speed advantages of the HT chain are hampered by the inherent delays and transaction routing limitations of current HT chain operations. Because all transactions are serviced by the host bridge and the host a limited number of transactions it can process at a given time, transaction latency is a significant issue for devices on the HT chain, particularly so for those devices residing at the far end of the HT chain, i.e., at or near the end-of-chain device. Further, because all communications serviced by the HT chain, both upstream and downstream, must share the bandwidth provided by the HT chain, the HT chain may have insufficient total capacity to simultaneously service all required transactions at their required bandwidth(s). Moreover, a limited number of transactions may be addressed at any time by any one device such as the host, e.g., 32 transactions (2**5). The host bridge is therefore limited in the number of transactions that it may have outstanding at any time and the host bridge may be unable to service all required transactions satisfactorily. Each of these operational limitations affects the ability of an HT chain to service the communications requirements of coupled devices.

Therefore, a need exists for smart routing of packets to facilitate direct peer-to-peer communications in a point-to-point link based system.

BRIEF SUMMARY OF THE INVENTION

The smart routing between peers in a point-to-point link based system of the present invention substantially meets these needs and others. In one embodiment, a device of a plurality of devices in a point-to-point link interconnected system begins a smart routing process by receiving a packet from an upstream link or a downstream link. The processing continues when the device interprets the packet to determine a destination of the packet. If the device is the destination of the packet, the device accepts the packet. If, however, the device is not the destination of the packet, the device forwards the packet on another upstream link or another downstream link without alteration of at least one of: source information of the packet and destination information of the packet.

In another embodiment, direct peer-to-peer communications among a plurality of devices in a connection based point-to-point system is begun when a first device of the plurality of devices generates a packet that includes destination information that identifies a second device of the plurality of devices and source information that identifies the first device. The processing continues when the first device transmits the packet on a point-to-point link of the connection based point-to-point system. The processing continues as another device of the plurality of devices receives the packet via the point-to-point link. The processing then continues as the another device interprets the packet to determine a destination of the packet based on the destination information. The processing further continues as the another device accepts the packet when it is the second device, i.e., it is the destination of the packet.

DETAILED DESCRIPTION OF THE INVENTION

Figure 1:
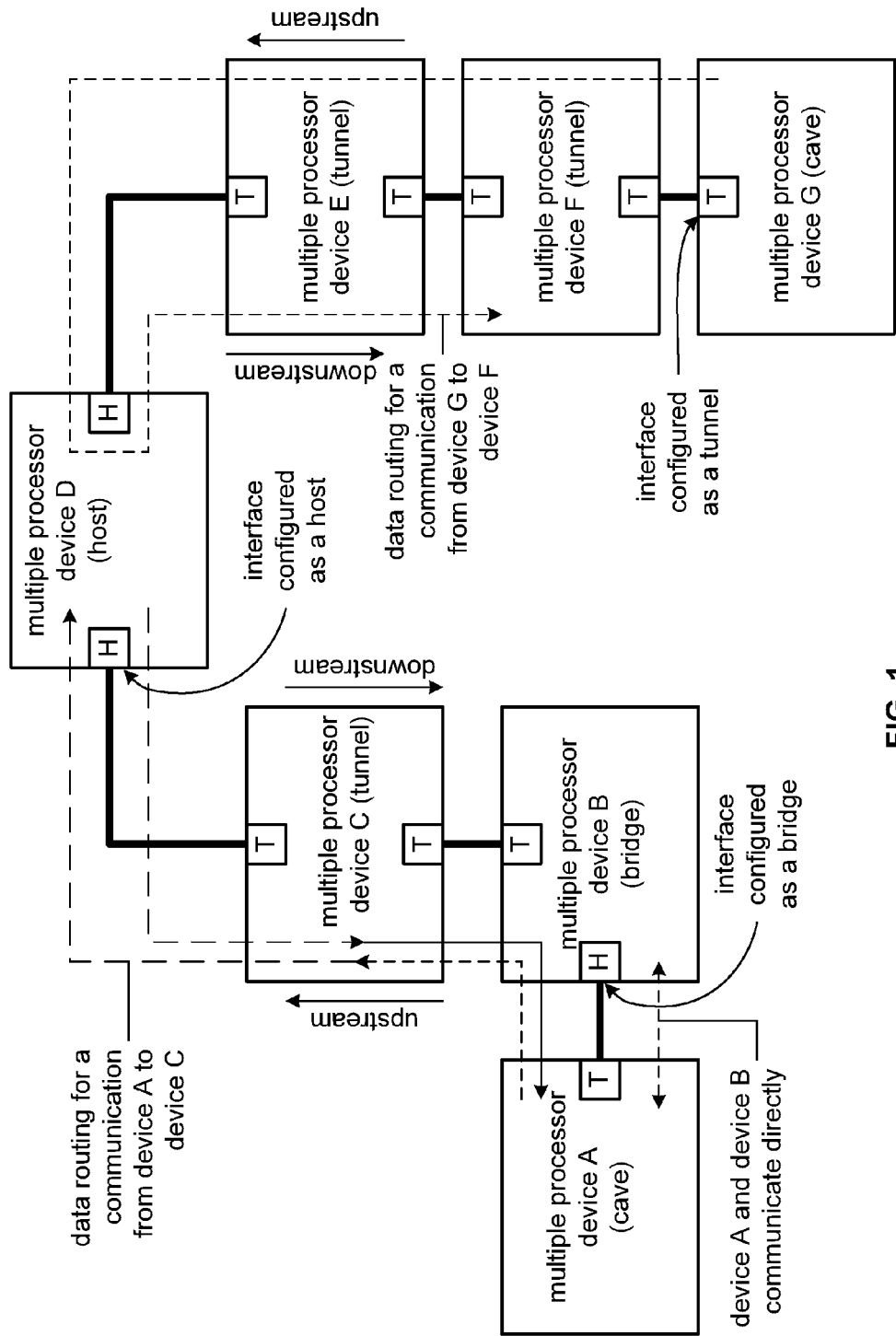
FIG. 1 is a schematic block diagram of a processing system in accordance with the present invention.

FIG. 1 is a schematic block diagram of a processing system 10 that includes a plurality of multiple processor devices A-G.

Each of the multiple processor devices A-G include at least two interfaces, which, in this illustration, are labeled as T for tunnel functionality or H for host or bridge functionality. The details of the multiple processor devices A-G will be described in greater detail with reference to FIG. 4.

In this example of a processing system 10, multiple processor device D is functioning as a host to support two primary chains. The $1^{st}$ primary chain includes multiple processor device C, which is configured to provide a tunnel function, and multiple processor device B, which is configured to provide a bridge function. The other primary chain supported by device D includes multiple processor devices E and F, which are each configured to provide tunneling functionality, and multiple processor device G, which is configured to provide a cave function. The processing system 10 also includes a secondary chain that includes multiple processor devices A and B, where device A is configured to provide a cave function. Multiple processor device B functions as the host for the secondary chain. By convention, data from the devices (i.e., nodes) in a chain to the host device is referred to as upstream data and data from the host device to the node devices is referred to as downstream data.

In general, when a multiple processor device is providing a tunneling function, it passes, without interpretation, all packets received from downstream devices (i.e., the multiple processor devices that, in the chain, are further away from the host device) to the next upstream device (i.e., an adjacent multiple processor device that, in the chain, is closer to the host device). For example, multiple processor device E provides all upstream packets received from downstream multiple processor devices F and G to host device D without interpretation, even if the packets are addressing multiple processor device E. The host device D modifies the upstream packets to identify itself as the source of packets and sends the modified packets downstream along with any packets that it generated. As the multiple processor devices receive the downstream packets, they interpret the packet to identify the host device as the source and to identify a destination. If the multiple processor device is not the destination, it passes the downstream packets to the next downstream node. For example, packets received from the host device D that are directed to the multiple processor device E will be processed by the multiple processor device E, but device E will pass packets for devices F and G. The processing of packets by device E includes routing the packets to a particular processing unit within device E, routing to local memory, routing to external memory associated with device E, et cetera.

In this configuration, if multiple processor device G desires to send packets to multiple processor device F, the packets would traverse through devices E and F to host device D. Host device D modifies the packets identifying the multiple processor device D as the source of the packets and provides the modified packets to multiple processor device E, which would in turn forward them to multiple processor device F. A similar type of packet flow occurs for multiple processor device B communicating with multiple processor device C, for communications between devices G and E, and for communications between devices E and F.

For the secondary chain, devices A and B can communication directly, i.e., they support peer-to-peer communications therebetween. In this instance, the multiple processor device B has one of its interfaces (H) configured to provide a bridge function. Accordingly, the bridge functioning interface of device B interprets packets it receives from device A to determine the destination of the packet. If the destination is local to device B (i.e., meaning the destination of the packet is one of the modules within multiple processor device B or associated with multiple processor device B), the H interface processes the received packet. The processing includes forwarding the packet to the appropriate destination within, or associated with, device B.

If the packet is not destined for a module within device B, multiple processor device B modifies the packet to identify itself as the source of the packets. The modified packets are then forwarded to the host device D via device C, which is providing a tunneling function. For example, if device A desires to communicate with device C, device A provides packets to device B and device B modifies the packets to identify itself as the source of the packets. Device B then provides the modified packets to host device D via device C. Host device D then, in turn, modifies the packets to identify itself as the source of the packets and provides the again modified packets to device C, where the packets are subsequently processed. Conversely, if device C were to transmit packets to device A, the packets would first be sent to host D, modified by device D, and the modified packets would be provided back to device C. Device C, in accordance with the tunneling function, passes the packets to device B. Device B interprets the packets, identifies device A as the destination, and modifies the packets to identify device B as the source. Device B then provides the modified packets to device A for processing thereby.

In the processing system 10, device D, as the host, assigns a node ID (identification code) to each of the other multiple processor devices in the system. Multiple processor device D then maps the node ID to a unit ID for each device in the system, including its own node ID to its own unit ID. Accordingly, by including a bridging functionality in device B, in accordance with the present invention, the processing system 10 allows for interfacing between devices using one or more communication protocols and may be configured in one or more configurations while overcoming bandwidth limitations, latency limitations and other limitations associated with the use of high speed HyperTransport chains. Such communication protocols include, but are not limited to, a HyperTransport protocol, system packet interface (SPI) protocol and/or other types of packet-switched or circuit-switched protocols.

Figure 2:
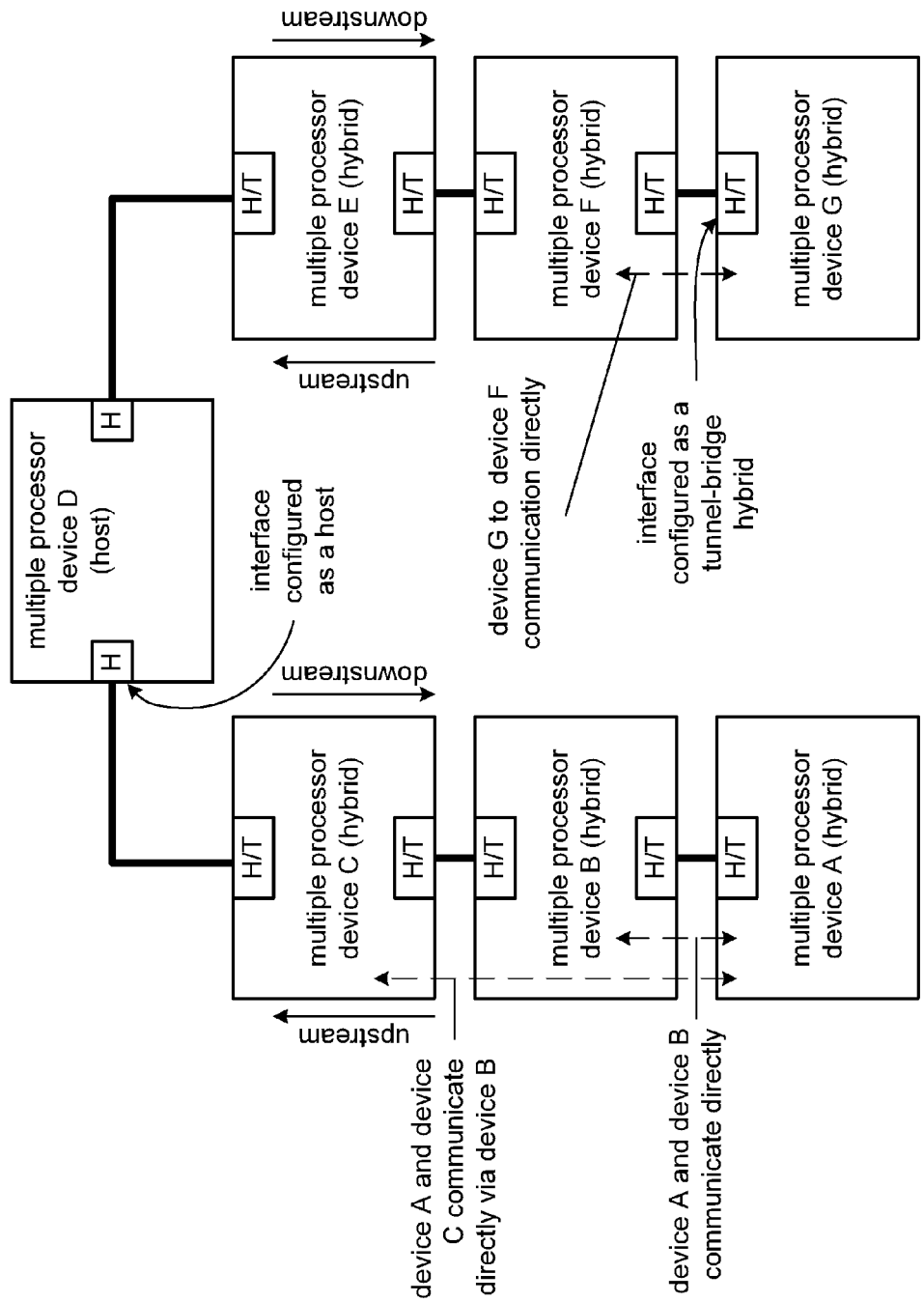
FIG. 2 is a schematic block diagram of an alternate processing system in accordance with the present invention.
Figure 4:
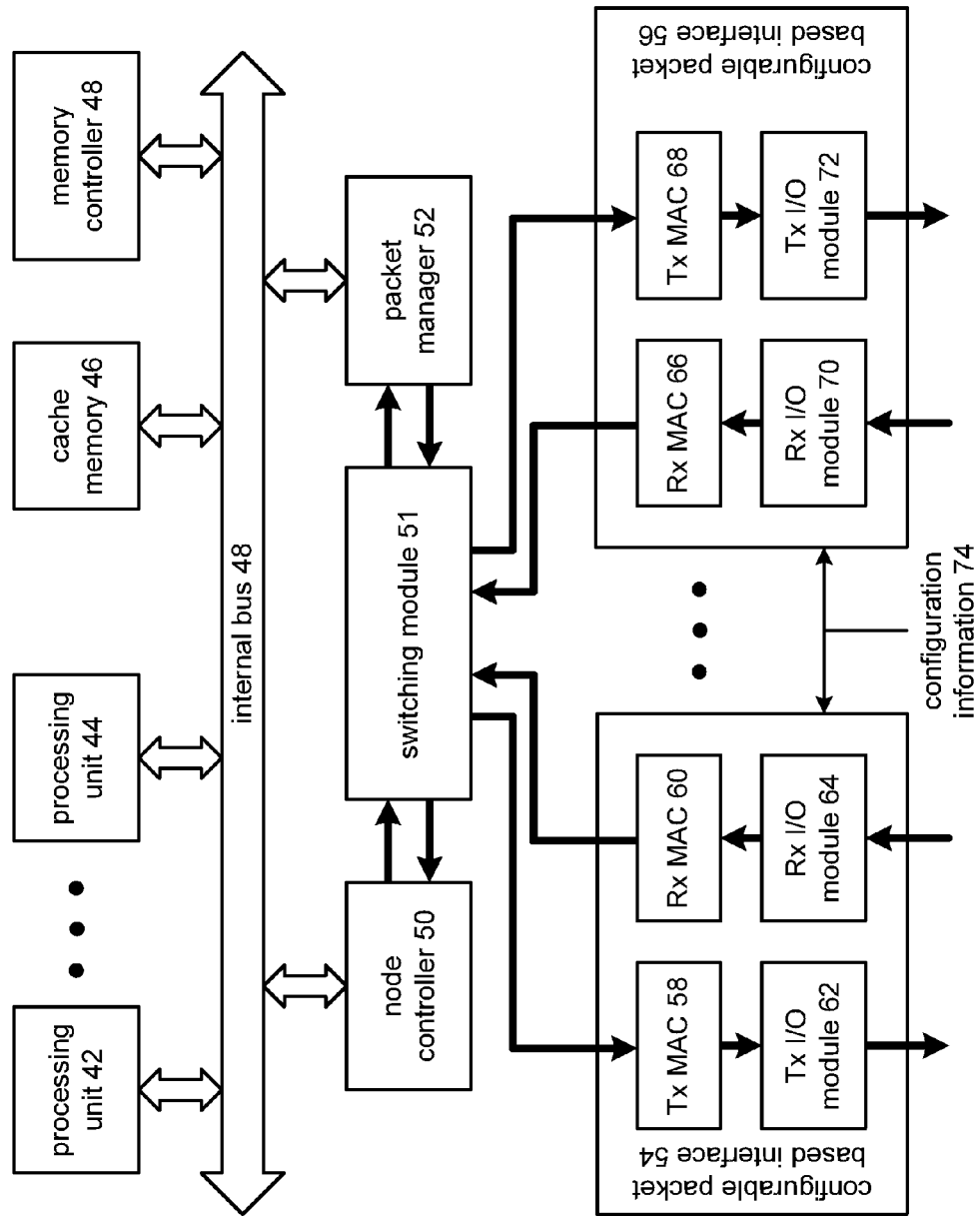
FIG. 4 is a schematic block diagram of a multiple processor device in accordance with the present invention.

FIG. 2 is a schematic block diagram of an alternate processing system 20 that includes a plurality of multiple processor devices A-G. In this system 20, multiple processor device D is the host device while the remaining devices are configured to support a tunnel-bridge hybrid interfacing functionality. Each of multiple processor devices A-C and E-G have their interfaces configured to support the tunnel-bridge hybrid (H/T) mode. With the interfacing configured in this manner, peer-to-peer communications may occur between multiple processor devices in a chain. For example, multiple processor device A may communicate directly with multiple processor device B and may communicate with multiple processor device C, via device B, without routing packets through the host device D. For peer-to-peer communication between devices A and B, multiple processor device B interprets the packets received from multiple processor device A to determine whether the destination of the packet is local to multiple processor device B. With reference to FIG. 4, a destination associated with multiple processor device B may be any one of the plurality of processing units 42-44, cache memory 46 or system memory accessible through the memory controller 48. Returning back to the diagram of FIG. 2, if the packets received from device A are destined for a module within device B, device B processes the packets by forwarding them to the appropriate module within device B. If the packets are not destined for device B, device B forwards them, without modifying the source of the packets, to multiple processor device C. As such, for this example, the source of packets remains device A.

The packets received by multiple processor device C are interpreted to determine whether a module within multiple processor device C is the destination of the packets. If so, device C processes them by forwarding the packets to the appropriate module within, or associated with, device C. If the packets are not destined for a module within device C, device C forwards them to the multiple processor device D. Device D modifies the packets to identify itself as the source of the packets and provides the modified packets to the chain including devices E-G. Note that device C, having interpreted the packets, passes only packets that are destined for a device other than itself in the upstream direction. Since device D is the only upstream device for the primary chain that includes device C, device D knows, based on the destination address, that the packets are for a device in the other primary chain.

Devices E-G, in order, interpret the modified packets to determine whether it is a destination of the modified packets. If so, the device processes the packets. If not, the device routes the packets to the next device in chain. In addition, devices E-G support peer-to-peer communications in a similar manner as devices A-C. Accordingly, by configuring the interfaces of the devices to support a tunnel-bridge hybrid function, the source of the packets is not modified (except when the communications are between primary chains of the system), which enables the devices to use one or more communication protocols (e.g., HyperTransport, system packet interface, et cetera) in a peer-to-peer configuration that substantially overcomes the bandwidth limitations, latency limitations and other limitations associated with the use of a conventional high-speed HyperTransport chain.

In general, a device configured as a tunnel-bridge hybrid has knowledge about which direction to send requests. For example, for device C to communicate with device A, device C knows that device A is downstream and is coupled to device B. As such, device C sends packets to device B for forwarding to device A as opposed to a traditional tunnel function, where device C would have to send packets for device A to device D, where device D would provide them back downstream after redefining itself as the source of the packets. To facilitate the more direct communications, each device maintains the address ranges, in range registers, for each link (or at least one of its links) and enforces ordering rules regardless of the Unit ID across its interfaces.

To facilitate the tunnel-hybrid functionality, since each device receives a unique Node ID, request packets are generated with the device's unique Node ID in the a Unit ID field of the packet. For packets that are forwarded upstream (or downstream), the Unit ID field and the source ID field of the request packets are preserved. As such, when the target device receives a request packet, the target device may accept the packet based on the address.

When the target device generates a response packet in response to a request packet(s), it uses the unique Node ID of the requesting device rather than the Node ID of the responding device. In addition, the responding device also preserves the Source Tag of the requesting device such that the response packet includes the Node ID and Source Tag of the requesting device. This enables the response packets to be accepted based on the Node ID rather than based on a bridge bit or direction of travel of the packet.

For a device to be configured as a tunnel-bridge hybrid, it export, at configuration of the system 20, a type 1 header (i.e., a bridge header in accordance with the HT specification) in addition to, or in place of, a type 0 header (i.e., a tunnel header in accordance with the HT specification). In response to the type 1 header, the host device programs the address range registers of the devices A-C and E-G regarding one or more links coupled to the devices. Once configured, the device utilizes the addresses in its address range registers to identify the direction (i.e., upstream link or downstream link) to send request packets and/or response packets to a particular device as described above.

Figure 3:
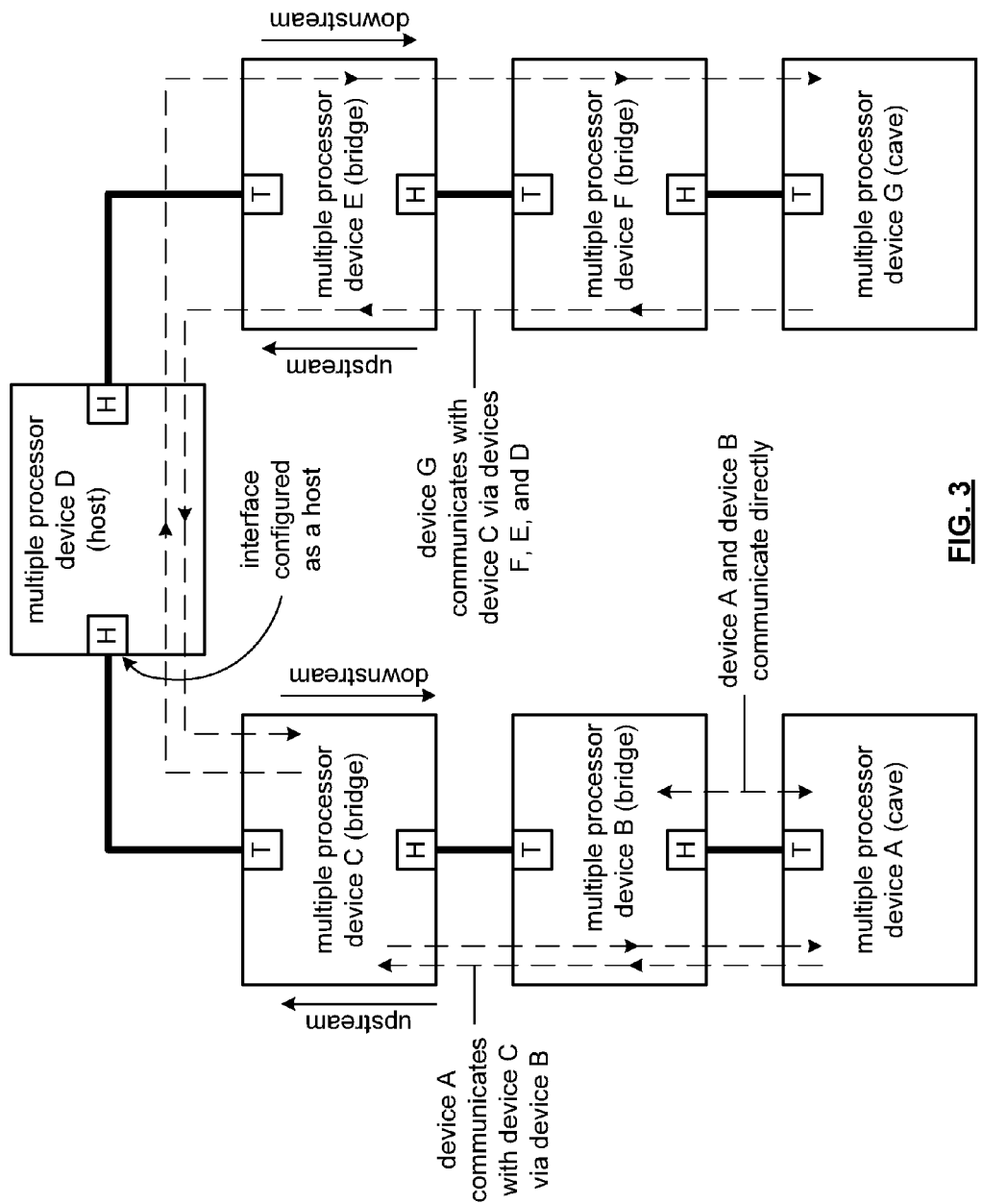
FIG. 3 is a schematic block diagram of another processing system in accordance with the present invention.

FIG. 3 is a schematic block diagram of processing system 30 that includes multiple processor devices A-G. In this embodiment, multiple processor device D is functioning as a host device for the system while the multiple processor devices B, C, E and F are configured to provide bridge functionality and devices A and G are configured to support a cave function. In this configuration, each of the devices may communicate directly (i.e., have peer-to-peer communication) with adjacent multiple processor devices via cascaded secondary chains. For example, device A may directly communicate with device B via a secondary chain therebetween, device B may communicate directly with device C via a secondary chain therebetween, device E may communicate directly with device F via a secondary chain therebetween, and device F may communicate directly with device G via a secondary chain therebetween. The primary chains in this example of a processing system exist between device D and device C and between device D and device E.

For communication between devices A and B, device B interprets packets received from device A to determine their destination. If device B is the destination, it processes it by providing it to the appropriate destination within, or associated with, device B. If a packet is not destined for device B, device B modifies the packet to identify itself as the source and forwards it to device C. Accordingly, if device A desires to communicate with device B, it does so directly since device B is providing a bridge function with respect to device A. However, for device A desires to communicate with device C, device B, as the host for the chain between devices A and B, modifies the packets to identify itself as the source of the packets. The modified packets are then routed to device C. To device C, the packets appear to be sourced from device B and not device A. For packets from device C to device A, device B modifies the packets to identify itself as the source of the packets and provides the modified packets to device A. In such a configuration, each device only knows that it is communicating with one device in the downstream direct and one device in the upstream direction. As such, peer-to-peer communication is supported directly between adjacent devices and is also supported indirectly (i.e., by modifying the packets to identify the host of the secondary chain as the source of the packets) between any devices in the system.

In any of the processing systems illustrated in FIGS. 1-3, the devices on one chain may communicate with devices on the other chain. An example of this is illustrated in FIG. 3 where device G may communicate with device C. As shown, packets from device G are propagated through devices D, E and F until they reach device C. Similarly, packets from device C are propagated through devices D, E and F until they reach device G. In the example of FIG. 3, the packets in the downstream direction and in the upstream direction are adjusted to modify the source of the packets. Accordingly, packets received from device G appear, to device C, to be originated by device D. Similarly, packets from device C appear, to device G, to be sourced by device F. As one of average skill in the art will appreciate, each device that is providing a host function or a bridge function maintains a table of communications for the chains it is the host to track the true source of the packets and the true destination of the packets.

FIG. 4 is a schematic block diagram of a multiple processor device 40 in accordance with the present invention. The multiple processor device 40 may be an integrated circuit or it may be constructed from discrete components. In either implementation, the multiple processor device 40 may be used as multiple processor device A-G in the processing systems illustrated in FIGS. 1-3.

The multiple processor device 40 includes a plurality of processing units 42-44, cache memory 46, memory controller 48, which interfaces with on and/or off-chip system memory, an internal bus 48, a node controller 50, a switching module 51, a packet manager 52, and a plurality of configurable packet based interfaces 54-56 (only two shown). The processing units 42-44, which may be two or more in numbers, may have a MIPS based architecture, to support floating point processing and branch prediction. In addition, each processing unit 42-44 may include a memory sub-system of an instruction cache and a data cache and may support separately, or in combination, one or more processing functions. With respect to the processing system of FIGS. 1-3, each processing unit 42-44 may be a destination within multiple processor device 40 and/or each processing function executed by the processing modules 42-44 may be a destination within the processor device 40.

The internal bus 48, which may be a 256 bit cache line wide split transaction cache coherent bus, couples the processing units 42-44, cache memory 46, memory controller 48, node controller 50 and packet manager 52 together. The cache memory 46 may function as an L2 cache for the processing units 42-44, node controller 50 and/or packet manager 52. With respect to the processing system of FIGS. 1-3, the cache memory 46 may be a destination within multiple processor device 40.

The memory controller 48 provides an interface to system memory, which, when the multiple processor device 40 is an integrated circuit, may be off-chip and/or on-chip. With respect to the processing system of FIGS. 1-3, the system memory may be a destination within the multiple processor device 40 and/or memory locations within the system memory may be individual destinations within the device 40. Accordingly, the system memory may include one or more destinations for the processing systems illustrated in FIGS. 1-3.

The node controller 50 functions as a bridge between the internal bus 48 and the configurable packet-based interfaces 54-56. Accordingly, accesses originated on either side of the node controller will be translated and sent on to the other. The node controller also supports the distributed shared memory model associated with the cache coherency non-uniform memory access (CC-NUMA) protocol.

The switching module 51 couples the plurality of configurable packet-based interfaces 54-56 to the node controller 50 and/or to the packet manager 52. The switching module 51 functions to direct data traffic, which may be in a generic format, between the node controller 50 and the configurable packet-based interfaces 54-56 and between the packet manager 52 and the configurable packet-based interfaces 54. The generic format may include 8 byte data words or 16 byte data words formatted in accordance with a proprietary protocol, in accordance with asynchronous transfer mode (ATM) cells, in accordance with internet protocol (IP) packets, in accordance with transmission control protocol/internet protocol (TCP/IP) packets, and/or in general, in accordance with any packet-switched protocol or circuit-switched protocol.

The packet manager 52 may be a direct memory access (DMA) engine that writes packets received from the switching module 51 into input queues of the system memory and reads packets from output queues of the system memory to the appropriate configurable packet-based interface 54-56. The packet manager 52 may include an input packet manager and an output packet manager each having its own DMA engine and associated cache memory. The cache memory may be arranged as first in first out (FIFO) buffers that respectively support the input queues and output queues.

The configurable packet-based interfaces 54-56 generally function to convert data from a high-speed communication protocol (e.g., HT, SPI, etc.) utilized between multiple processor devices 40 and the generic format of data within the multiple processor devices 40. Accordingly, the configurable packet-based interface 54 or 56 may convert received HT or SPI packets into the generic format packets or data words for processing within the multiple processor device 40. In addition, the configurable packet-based interfaces 54 and/or 56 may convert the generic formatted data received from the switching module 51 into HT packets or SPI packets. The particular conversion of packets to generic formatted data performed by the configurable packet-based interfaces 54 and 56 is based on configuration information 74, which, for example, indicates configuration for HT to generic format conversion or SPI to generic format conversion.

Each of the configurable packet-based interfaces 54-56 includes a transmit media access controller (Tx MAC) 58 or 68, a receiver (Rx) MAC 60 or 66, a transmitter input/output (I/O) module 62 or 72, and a receiver input/output (I/O) module 64 or 70. In general, the transmit MAC module 58 or 68 functions to convert outbound data of a plurality of virtual channels in the generic format to a stream of data in the specific high-speed communication protocol (e.g., HT, SPI, etc.) format. The transmit I/O module 62 or 72 generally functions to drive the high-speed formatted stream of data onto the physical link coupling the present multiple processor device 40 to another multiple processor device. The transmit I/O module 62 or 72 is further described, and incorporated herein by reference, in co-pending patent application entitled MULTI-FUNCTION INTERFACE AND APPLICATIONS THEREOF, having Ser. No. 10/305,648, and having the same filing date and priority date as the present application. The receive MAC module 60 or 66 generally functions to convert the received stream of data from the specific high-speed communication protocol (e.g., HT, SPI, etc.) format into data from a plurality of virtual channels having the generic format. The receive I/O module 64 or 70 generally functions to amplify and time align the high-speed formatted steam of data received via the physical link coupling the present multiple processor device 40 to another multiple processor device. The receive I/O module 64 or 70 is further described, and incorporated herein by reference, in co-pending patent application entitled RECEIVER MULTI-PROTOCOL INTERFACE AND APPLICATIONS THEREOF, having Ser. No. 10/306, 558, and having the same filing date and priority date as the present application.

The transmit and/or receive MACs 58, 60, 66 and/or 68 may include, individually or in combination, a processing module and associated memory to perform its correspond functions. The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory stores, and the processing module executes, operational instructions corresponding to the functionality performed by the transmitter MAC 58 or 68 as disclosed, and incorporated herein by reference, in co-pending patent application entitled TRANSMITTING DATA FROM A PLURALITY OF VIRTUAL CHANNELS VIA A MULTIPLE PROCESSOR DEVICE, having Ser. No. 10/356,348 and having the same filing date and priority date as the present patent application and corresponding to the functionality performed by the receiver MAC module 60 or 66 as further described in FIGS. 6-10.

In operation, the configurable packet-based interfaces 54-56 provide the means for communicating with other multiple processor devices 40 in a processing system such as the ones illustrated in FIG. 1, 2 or 3. The communication between multiple processor devices 40 via the configurable packet-based interfaces 54 and 56 is formatted in accordance with a particular high-speed communication protocol (e.g., Hyper-Transport (HT) or system packet interface (SPI)). The configurable packet-based interfaces 54-56 may be configured to support, at a given time, one or more of the particular high-speed communication protocols. In addition, the configurable packet-based interfaces 54-56 may be configured to support the multiple processor device 40 in providing a tunnel function, a bridge function, or a tunnel-bridge hybrid function.

When the multiple processor device 40 is configured to function as a tunnel-hybrid node, the configurable packet-based interface 54 or 56 receives the high-speed communication protocol formatted stream of data and separates, via the MAC module 60 or 68, the stream of incoming data into generic formatted data associated with one or more of a plurality a particular virtual channels. The particular virtual channel may be associated with a local module of the multiple processor device 40 (e.g., one or more of the processing units 42-44, the cache memory 46 and/or memory controller 48) and, accordingly, corresponds to a destination of the multiple processor device 40 or the particular virtual channel may be for forwarding packets to the another multiple processor device.

The interface 54 or 56 provides the generically formatted data words, which may comprise a packet, or portion thereof, to the switching module 51, which routes the generically formatted data words to the packet manager 52 and/or to node controller 50. The node controller 50, the packet manager 52 and/or one or more processing units 42-44 interprets the generically formatted data words to determine a destination therefor. If the destination is local to multiple processor device 40 (i.e., the data is for one of processing units 42-44, cache memory 46 or memory controller 48), the node controller 50 and/or packet manager 52 provides the data, in a packet format, to the appropriate destination. If the data is not addressing a local destination, the packet manager 52, node controller 50 and/or processing unit 42-44 causes the switching module 51 to provide the packet to one of the other configurable packet-based interfaces 54 or 56 for forwarding to another multiple processor device in the processing system. For example, if the data were received via configuration packet-based interface 54, the switching module 51 would provide the outgoing data to configurable packet-based interface 56. In addition, the switching module 51 provides outgoing packets generated by the local modules of processing module device 40 to one or more of the configurable packet-based interfaces 54-56.

The configurable packet-based interface 54 or 56 receives the generic formatted data via the transmitter MAC module 58 or 68. The transmitter MAC module 58, or 68 converts the generic formatted data from a plurality of virtual channels into a single stream of data. The transmitter input/output module 62 or 72 drives the stream of data on to the physical link coupling the present multiple processor device to another.

When the multiple processor device 40 is configured to function as a tunnel node, the data received by the configurable packet-based interfaces 54 from a downstream node is routed to the switching module 51 and then subsequently routed to another one of the configurable packet-based interfaces for transmission upstream without interpretation. For downstream transmissions, the data is interpreted to determine whether the destination of the data is local. If not, the data is routed downstream via one of the configurable packet-based interfaces 54 or 56.

When the multiple processor device 40 is configured as a bridge node, upstream packets that are received via a configurable packet-based interface 54 are modified via the interface 54, interface 56, the packet manager 52, the node controller 50, and/or processing units 42-44 to identify the current multiple processor device 40 as the source of the data. Having modified the source, the switching module 51 provides the modified data to one of the configurable packet-based interfaces for transmission upstream. For downstream transmissions, the multiple processor device 40 interprets the data to determine whether it contains the destination for the data. If so, the data is routed to the appropriate destination. If not, the multiple processor device 40 forwards the packet via one of the configurable packet-based interfaces 54 or 56 to a downstream device.

To determine the destination of the data, the node controller 50, the packet manager 52 and/or one of the processing units 42 or 44 interprets header information of the data to identify the destination (i.e., determines whether the target address is local to the device). In addition, a set of ordering rules of the received data is applied when processing the data, where processing includes forwarding the data, in packets, to the appropriate local destination or forwarding it onto another device. The ordering rules include the HT specification ordering rules and rules regarding non-posted commands being issued in order of reception. The rules further include that the interfaces are aware of whether they are configured to support a tunnel, bridge, or tunnel-bridge hybrid node. With such awareness, for every ordered pair of transactions, the receiver portion of the interface will not make a new transaction of an ordered pair visible to the switching module until the old transaction of an ordered pair has been sent to the switching module. The node controller, in addition to adhering to the HT specified ordering rules, treats all HT transactions as being part of the same input/output stream, regardless of which interface the transactions was received from. Accordingly, by applying the appropriate ordering rules, the routing to and from the appropriate destinations either locally or remotely is accurately achieved.

Figure 5:
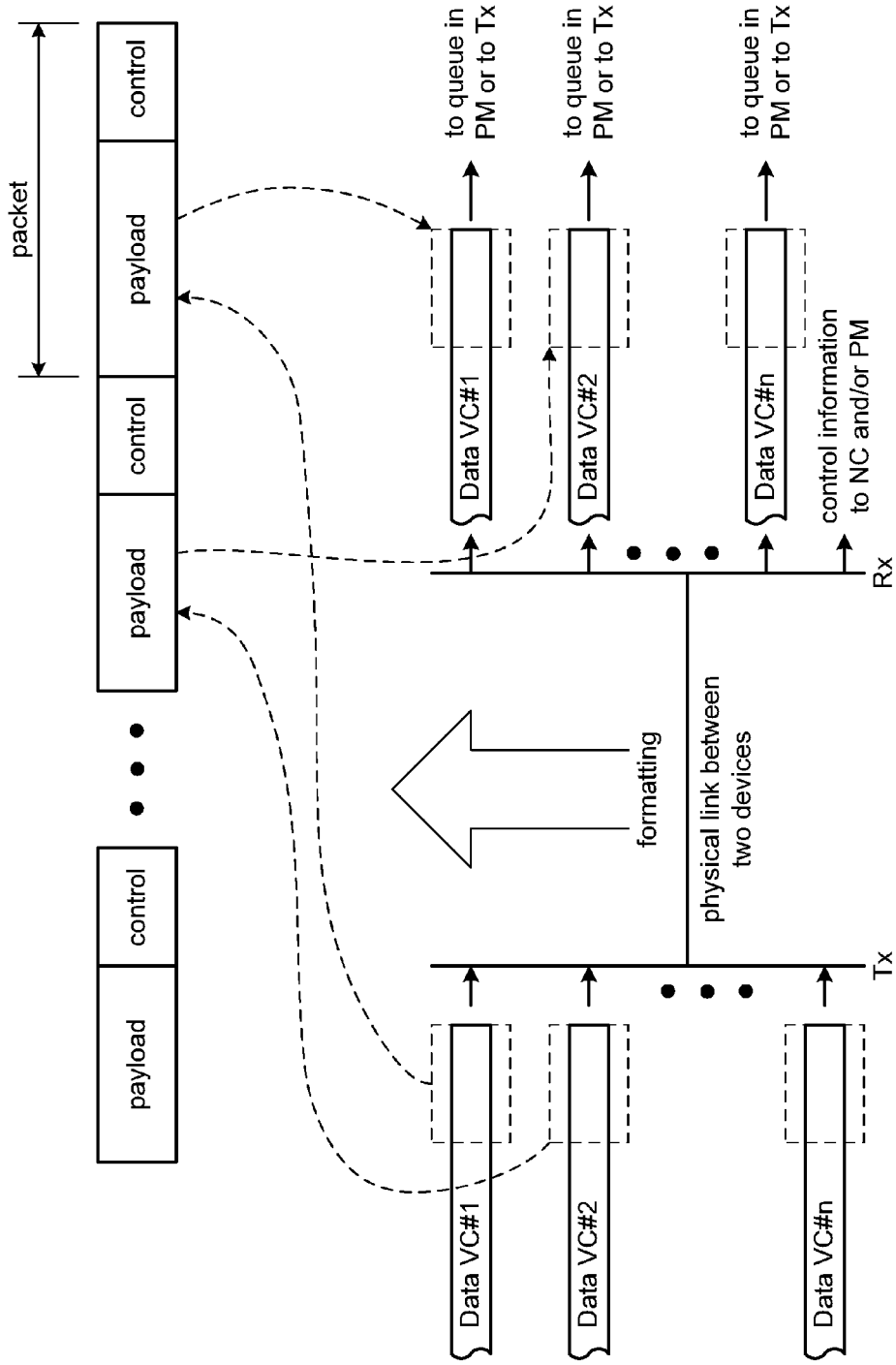
FIG. 5 is a graphical representation of transporting data between devices in accordance with the present invention.

FIG. 5 is a graphical representation of the functionality performed by the node controller 50, the switching module 51, the packet manager 52 and/or the configurable packet-based interfaces 54 and 56. In this illustration, data is transmitted over a physical link between two devices in accordance with a particular high-speed communication protocol (e.g., HT, SPI-4, etc.). Accordingly, the physical link supports a protocol that includes a plurality of packets. Each packet includes a data payload and a control section. The control section may include header information regarding the payload, control data for processing the corresponding payload of a current packet, previous packet(s) or subsequent packet (s), and/or control data for system administration functions.

Within a multiple processor device, a plurality of virtual channels may be established. A virtual channel may correspond to a particular physical entity, such as processing units 42-44, cache memory 46 and/or memory controller 48, and/or to a logical entity such as a particular algorithm being executed by one or more of the processing modules 42-44, particular memory locations within cache memory 46 and/or particular memory locations within system memory accessible via the memory controller 48. In addition, one or more virtual channels may correspond to data packets received from downstream or upstream nodes that require forwarding. Accordingly, each multiple processor device supports a plurality of virtual channels. The data of the virtual channels, which is illustrated as data virtual channel number 1 (VC#1), virtual channel number 2 (VC#2) through virtual channel number N (VC#n) may have a generic format. The generic format may be 8 byte data words, 16 byte data words that correspond to a proprietary protocol, ATM cells, IP packets, TCP/IP packets, other packet switched protocols and/or circuit switched protocols.

As illustrated, a plurality of virtual channels is sharing the physical link between the two devices. The multiple processor device 40, via one or more of the processing units 42-44, node controller 50, the interfaces 54-56, and/or packet manager 52 manages the allocation of the physical link among the plurality of virtual channels. As shown, the payload of a particular packet may be loaded with one or more segments from one or more virtual channels. In this illustration, the 1$^{st}$ packet includes a segment, or fragment, of virtual channel number 1. The data payload of the next packet receives a segment, or fragment, of virtual channel number 2. The allocation of the bandwidth of the physical link to the plurality of virtual channels may be done in a round-robin fashion, a weighted round-robin fashion or some other application of fairness. The data transmitted across the physical link may be in a serial format and at extremely high data rates (e.g., 3.125 gigabits-per-second or greater), in a parallel format, or a combination thereof (e.g., 4 lines of 3.125 Gbps serial data).

At the receiving device, the stream of data is received and then separated into the corresponding virtual channels via the configurable packet-based interface, the switching module 51, the node controller 50, the interfaces 54-56, and/or packet manager 52. The recaptured virtual channel data is either provided to an input queue for a local destination or provided to an output queue for forwarding via one of the configurable packet-based interfaces to another device. Accordingly, each of the devices in a processing system as illustrated in FIGS. 1-3 may utilize a high speed serial interface, a parallel interface, or a plurality of high speed serial interfaces, to transceive data from a plurality of virtual channels utilizing one or more communication protocols and be configured in one or more configurations while substantially overcoming the bandwidth limitations, latency limitations, limited concurrency (i.e., renaming of packets) and other limitations associated with the use of a high speed HyperTransport chain. Configuring the multiple processor devices for application in the multiple configurations of processing systems is described in greater detail and incorporated herein by reference in co-pending patent application entitled MULTIPLE PROCESSOR INTEGRATED CIRCUIT HAVING CONFIGURABLE PACKET-BASED INTERFACES, having Ser. No. 10/356,390, and having the same filing date and priority date as the present patent application.

Figures 6, 7:
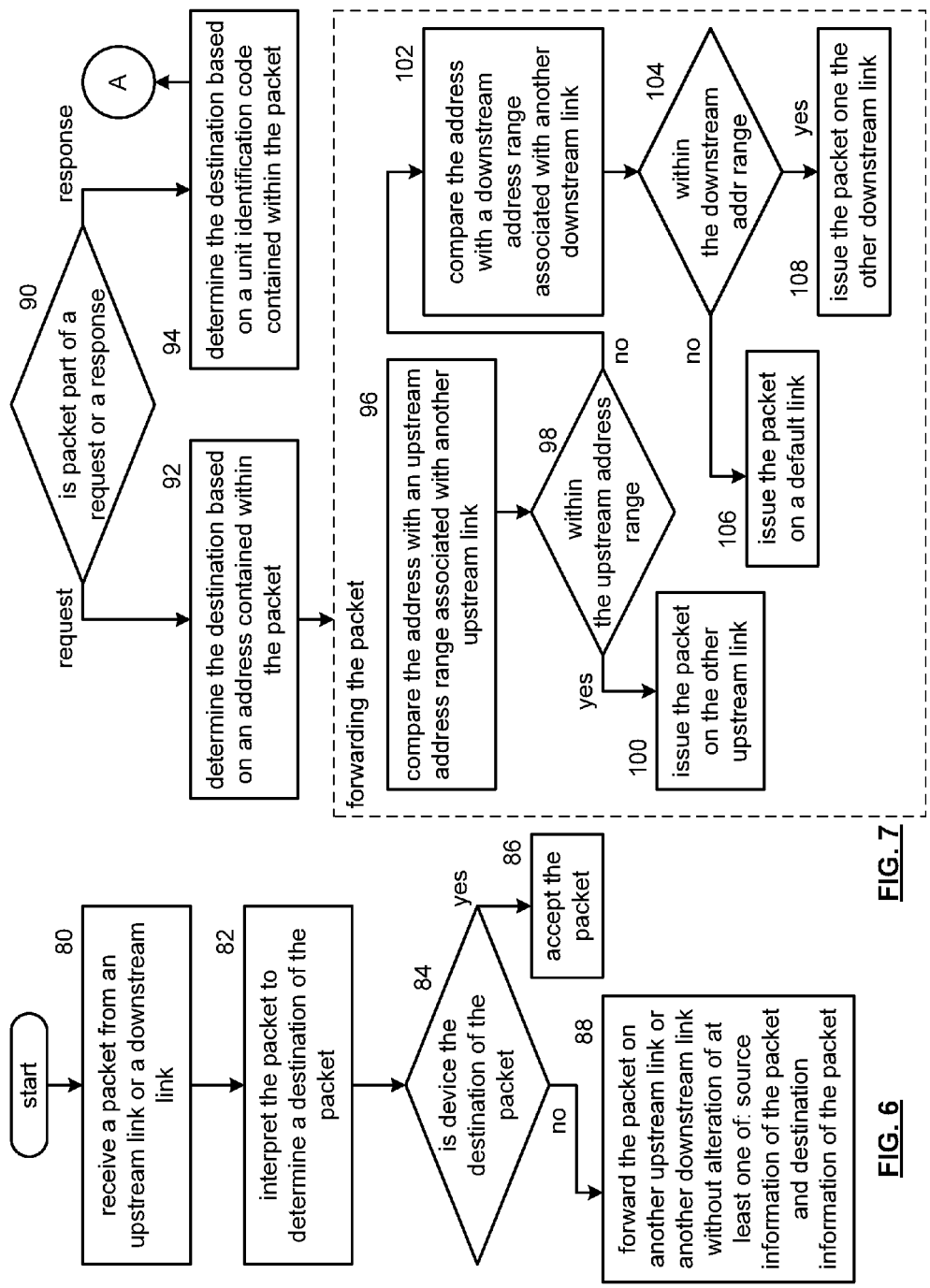
FIGS. 6-8 are a logic diagram of a method for smart routing in a system that includes a plurality of devices interconnected via connection based point-to-point links in accordance with the present invention.
Figure 8:
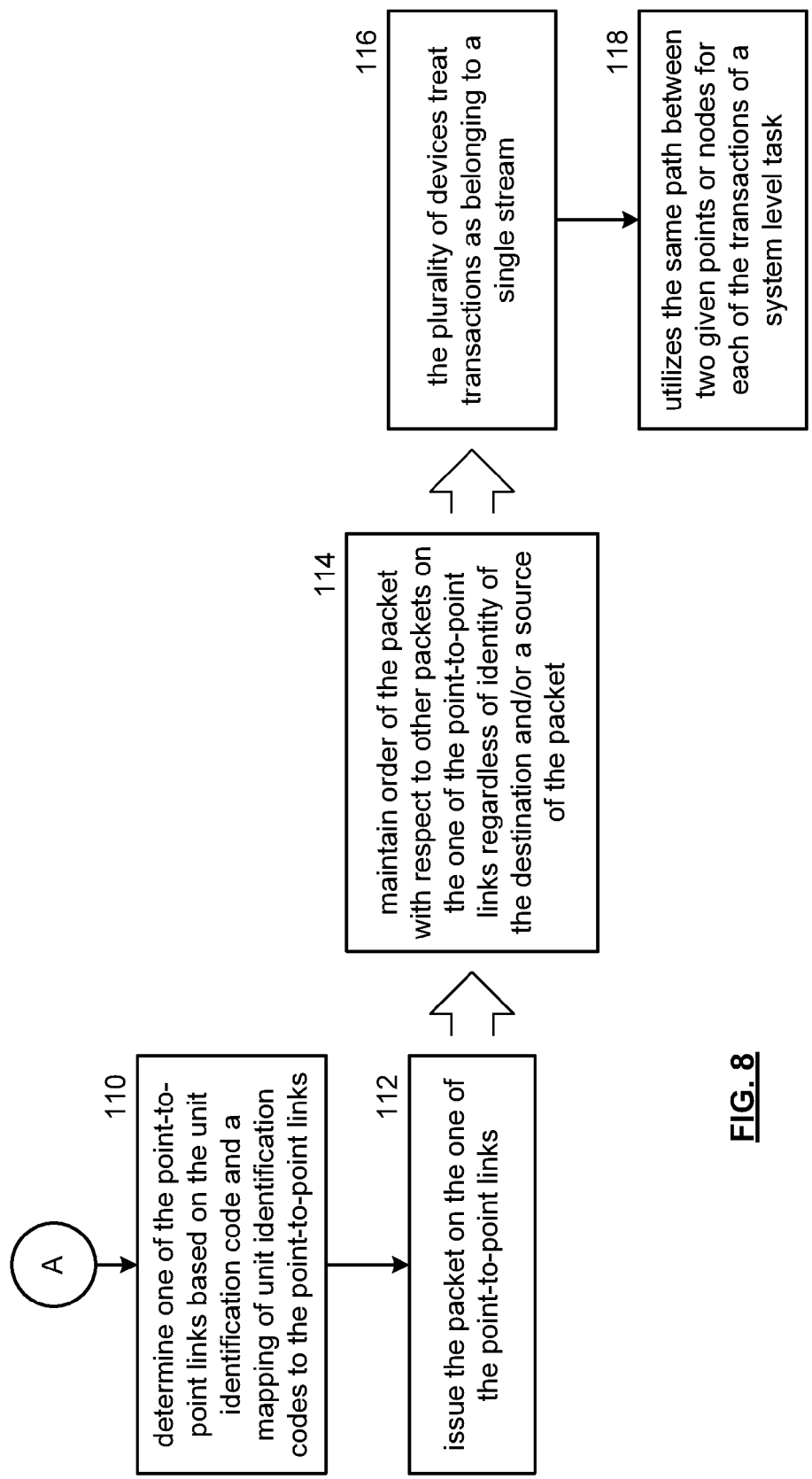

FIG. 6 is a logic diagram of a method for smart routing in a system that includes a plurality of devices interconnected via connection based point-to-point links. The process begins at step 80 where a device of the plurality of devices receives a packet from an upstream link or a downstream link. The upstream and downstream links may be constructed to support HyperTransport (HT) packet communications. The process then proceeds to step 82, where the device interprets the packet to determine a destination of the packet based on destination information contained in the packet. The interpretation of step 82 will be described in greater detail with reference to FIGS. 7 and 8.

The process then proceeds to step 84 where the device determines whether it is the destination of the packet. If so, the process proceeds to step 86 where the device accepts the packet and processes it accordingly. If not, the process proceeds to step 88 where the device forwards the packet on another upstream link or another downstream link without alteration of the source information of the packet and/or the destination information of the packet. The forwarding of packets will be described in greater detail with reference to FIG. 7.

FIG. 7 is a logic diagram further illustrating the interpretation of step 82 and the forwarding of packets of step 88 of FIG. 6. The interpreting begins at step 90 where the device determines whether the packet is part of a request or a response. If the packet is part of a request, the process proceeds to step 92, where the device determines the destination based on an address contained in the packet. If the address is for one of the addressable elements of the device (e.g., the configurable packet based interfaces 54 and 56, the switching module 51, the packet manager 52, the node controller 50, one or more of the processing modules 42-44, the cache memory 46, and/or the memory coupled to the device via the memory controller 48), the device accepts the packet and provides it to the appropriate element. If, however, the address is not for one of the addressable elements of the device, the device forwards the packet as shown in steps 96-108.

At step 96, the address is compared with an upstream address range associated with an upstream link. The process then proceeds to step 98 where the device determined whether the address is within the address range of the upstream link. If yes, the process proceeds to step 100, where the packet is issued on the upstream link. The issuing of the packet is done by maintaining order of the packet with respect to other packets on the upstream link regardless of identity of the destination and/or of the source of the packet. The order may be maintained by having each of the plurality of devices treat transactions as belonging to a single stream. Further, the plurality of devices utilizes the same path between two given points or nodes for each of the transactions of a system level task.

If the address is not within the upstream address range, the process proceeds to step 102, where the device compares the address with a downstream address range associated with a downstream link. The process then proceeds to step 104 where the device determines whether the address is within the downstream address range. If so, the process proceeds to step 108, where the packet is issued on the downstream link. If, however, the address is not within the downstream address range, the process proceeds to step 106 where the packet is issued on a default link. The issuing of the packet is done by maintaining order, in accordance with ordering rules, of the packet with respect to other packets on the downstream, or default, link regardless of identity of the destination and/or of the source of the packet. The ordering rules include a rule that the plurality of devices treats transactions as belonging to a single stream. Further, the plurality of devices utilizes the same path between two given points or nodes for each of the transactions of a system level task. For example, devices A and B of FIG. 2 may communication, on a task-by-task basis, using a peer-to-peer communication path or a legacy communication path (i.e., all communications go through the host device D). As such, if one task (e.g., direct memory access (DMA) function, file transfer, data transfer, etc.) uses a peer-to-peer communication path, all transactions for this task use this path. Further, a separate task between A and B may simultaneously be supported by a legacy path. Regardless of which path is being used, the other devices in the system treat the transactions of a task as belonging to a single stream.

If, at step 90, the packet is determined to be part of a response, the process proceeds to step 94 where the device determines the destination of the packet based on a unit identification code contained within the packet. If the unit identification code contained in the packet matches the unit identification code of the device, the device accepts the packet. If, however, the unit identification code does not match, the process proceeds to step 110 of FIG. 8. At step 110, the device determines one of the point-to-point links to forward the packet based on the unit identification code and a mapping of the unit identification codes to the point-to-point links (i.e., a listing of the other devices in the system based on their identification codes and whether they are upstream or down stream from the current device).

The process then proceeds to step 112 where the device issues the packet on the identified link. The issuing of the packet may be done in accordance with step 114, where the device maintains the order of the packet with respect to other packets on the link regardless of the source of the packet and/or the destination of the packet. Step 114 may be expanded as shown in steps 116 and 118. At step 116, each of the plurality of devices treats transactions as belonging to a single stream of data. At step 118, the devices utilizes the same path between two given points or nodes for each of the transactions of a system level task.

Figure 9:
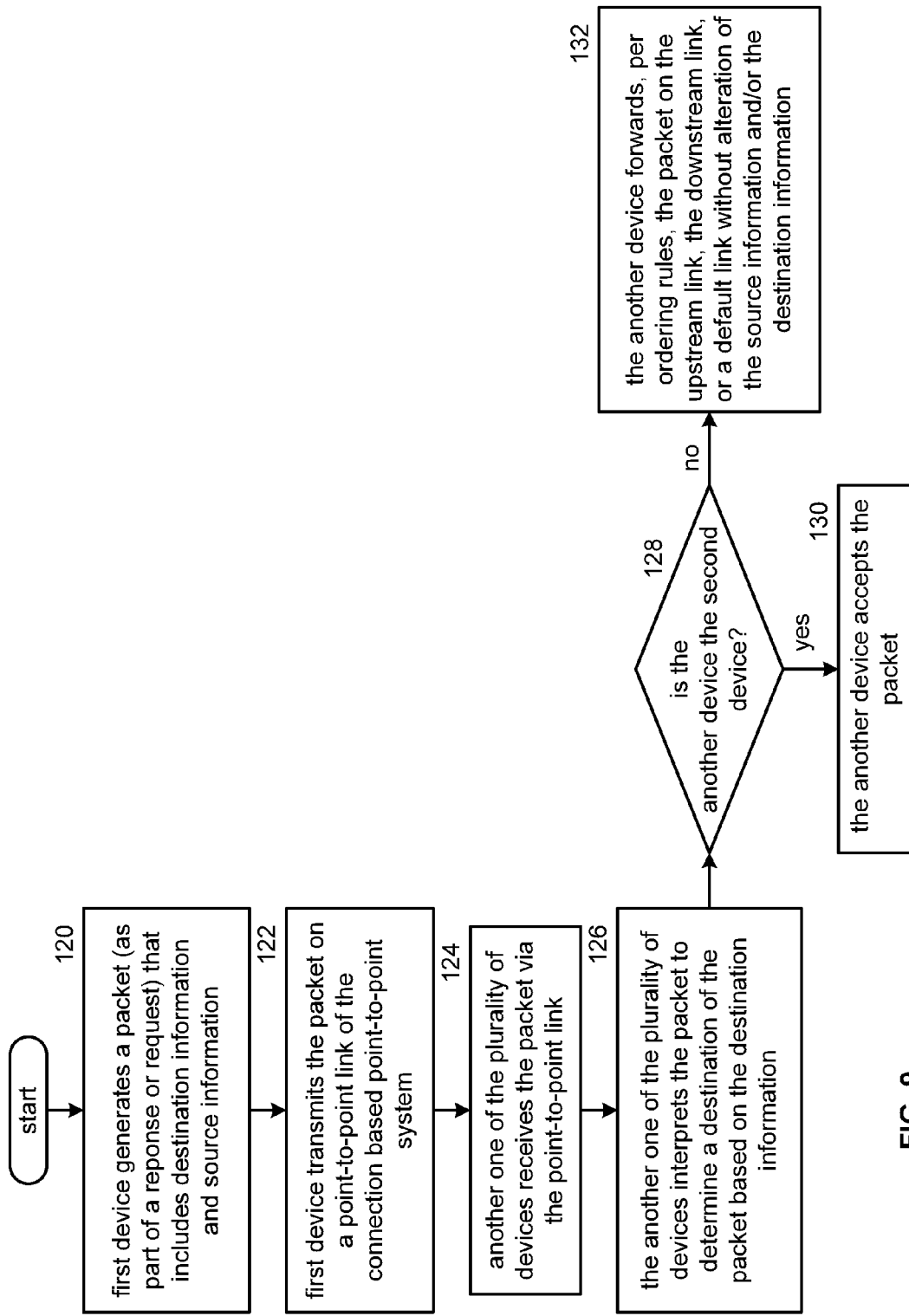
FIG. 9 is a logic diagram of a method for direct peer-to-peer communications among a plurality of devices in a connection based point-to-point system in accordance with the present invention.

FIG. 9 is a logic diagram of a method for direct peer-to-peer communications among a plurality of devices in a connection based point-to-point system. The process begins at step 120 where a first device of the plurality of devices generates a packet that includes destination information that identifies a second device of the plurality of devices (i.e., the intended recipient device) and source information that identifies the first device. The packet may be generated as part of a request, wherein the destination information includes an address of the destination. Alternatively, the packet may be generated as part of a response, wherein the destination information includes a unit identification code of the destination.

Based on the destination information, the device provides the packet on an upstream link or a downstream link. For example of a packet that is part of a request, the device compares the address of the destination with an upstream address list and a downstream address list. If the address is within the upstream address list, the packet is provided on the upstream link. If the address is within the downstream address list, the packet is provided on the downstream link. If the address is not within either list, it is provided on a default link. For example of a packet that is part of a response, the device utilizes a unit identification codes to linking mapping to identify the upstream or downstream link.

The process then proceeds to step 122, where the first devices transmits the packet on a point-to-point link of the connection based point-to-point system. The first device may transmit the packet on an upstream link when the second device is upstream from the first device or transmit the packet on a downstream link when the second device is downstream from the first device. The first device may identify the upstream link when an address of the second device is within an address range associated with the upstream link and identify the downstream link when the address of the second device is within an address range associated with the downstream link.

The process then proceeds to step 124 where another one of the plurality of devices receives the packet via the point-to-point link. The process then proceeds to step 126 where the another device interprets the packet to determine a destination of the packet based on the destination information. This may be done as discussed with reference to FIGS. 7 and 8. The process then proceeds to step 128 where the another device determines whether it is the second device (i.e., whether it is the desired recipient of the packet). If not, the process proceeds to step 132 where the another device forwards, in accordance with the ordering rules, the packet on an upstream, downstream, or default link as discussed in FIGS. 7 and 8. If the another device is the desired recipient, the process proceeds to step 130 where the another device accepts the packet.

As one of average skill in the art will appreciate, any one of the devices shown in FIGS. 1-5 may perform all or a portion the methods illustrated in FIGS. 6-9. Further, as one of average skill in the art will appreciate, other embodiments may be derived from the teachings of the present invention without deviating from the scope of the claims.

What is claimed is:

1. A method for smart routing by a device operable in a system that includes a plurality of devices and a host device interconnected via connection based point-to-point links in a daisy chain supporting HyperTransport (HT) packet communications, the method comprises:
   generating, by the device, an HT packet as part of a request, wherein the packet includes, at least, destination information, source information and data, wherein the device includes a hybrid HT function for routing HT packet communications in the daisy chain;
   determining, by the device, a destination of the packet when part of the request by:
      comparing an address of the destination from the destination information with an upstream address range associated with an upstream link;
      when the address is within the upstream address range, routing the packet on the upstream link of the point-to-point links in the daisy chain to the host device of the daisy chain supporting HyperTransport (HT) packet communications;
      when the address is not within the upstream address range, comparing the address with a downstream address range associated with a downstream link; and
      when the address is within the downstream address range, routing the packet on the downstream link of the point-to-point links in the daisy chain supporting HyperTransport (HT) packet communications.

2. The method of claim 1, further comprising:
   when the address is not within the upstream or downstream address range, providing the packet on a default link.

3. The method of claim 1, further comprising:
   generating the packet as part of a response; and
   when the packet is part of the response, utilizing a unit identification code of the destination to determine the upstream link or the downstream link.

4. The method of claim 1, wherein the routing the packet on the downstream link further comprises:
   maintaining order of the packet with respect to other packets in a same transaction on the downstream link such that the plurality of devices treats the packet and the other packets in the same transaction as belonging to a single stream in accordance with transaction ordering rules.

5. The method of claim 1, further comprising:
   utilizing a same path between two devices of the plurality of devices for each transaction of a system level task.

6. The method of claim 3, wherein, when the packet is part of the response, utilizing a unit identification code further comprises:
   determining the upstream link or the downstream link based on the unit identification code and a mapping of unit identification codes to the point-to-point links.

7. The method of claim 6, further comprises:
   maintaining order of the packet with respect to other packets on the upstream link or the downstream link regardless of identity of at least one of: the destination and a source of the packet.

8. The method of claim 7, wherein maintaining the order of the packet further comprises at least one of:
   treating transactions as belonging to a single stream in accordance with transaction ordering rules, wherein one of the transactions includes the packet.

9. A device capable of smart routing in a system that includes a plurality of devices and a host device interconnected via connection based point-to-point links in a daisy chain supporting HyperTransport (HT) packet communications, the device comprises:
   processing module; and
   memory operably coupled to the processing module, wherein the memory includes operational instructions that cause the processing module to:
      generate an HT packet as part of a request, wherein the packet includes, at least, destination information, source information and data, wherein the device includes a hybrid HT function for routing HT packet communications in the daisy chain;
      determine a destination of the packet when part of the request by:
         comparing an address of the destination from the destination information with an upstream address range associated with an upstream link;
         when the address is within the upstream address range, routing the packet on the upstream link of the point-to-point links in the daisy chain to the host device of the daisy chain supporting HyperTransport (HT) packet communications;
         when the address is not within the upstream address range, comparing the address with a downstream address range associated with a downstream link; and
         when the address is within the downstream address range, routing the packet on the downstream link of the point-to-point links in the daisy chain supporting HyperTransport (HT) packet communications.

10. The device of claim 9, wherein the memory further comprises operational instructions that cause the processing module to:
    when the address is not within the upstream or downstream address range, providing the packet on a default link.

11. The device of claim 9, wherein the memory further comprises operational instructions that cause the processing module to:
generate the packet as part of a response; and
when the packet is part of the response, utilize a unit identification code of the destination to determine the upstream link or the downstream link.

12. The device of claim 9, wherein the memory further comprises operational instructions that cause the processing module to:
when routing the packet on the downstream link, maintain order of the packet with respect to other packets in a same transaction on the downstream link such that the plurality of devices treats the packet and the other packets in the same transaction as belonging to a single stream in accordance with transaction ordering rules.

13. The device of claim 9, wherein the memory further comprises operational instructions that cause the processing module to:
utilize a same path between two devices of the plurality of devices for each transaction of a system level task.

14. The device of claim 11, wherein the memory further comprises operational instructions that cause the processing module to:
when utilizing a unit identification code, determine the upstream link or the downstream link based on the unit identification code and a mapping of unit identification codes to the point-to-point links.

15. The device of claim 14, wherein the memory further comprises operational instructions that cause the processing module to:
maintain order of the packet with respect to other packets on the upstream link or the downstream link regardless of identity of at least one of: the destination and a source of the packet.

16. The method of claim 15, wherein the memory further comprises operational instructions that cause the processing module to:
maintain the order of the packet by treating transactions as belonging to a single stream in accordance with transaction ordering rules, wherein one of the transactions includes the packet.

17. A method for direct peer-to-peer communications by a first device of a plurality of devices interconnected to a host device via a daisy chain with point to point links supporting HyperTransport (HT) protocol, the method comprises:
receiving, by an interface with a hybrid function for HT protocol communications in the first device of the plurality of devices, an HT protocol packet as part of a request via an upstream point-to-point link of the daisy chain supporting HT protocol communications;
interpreting, by the first device of the plurality of devices, the packet to determine a destination of the packet based on the destination information;
when the first device of the plurality of devices is the destination of the HT protocol packet, accepting the HT protocol packet by the first device of the plurality of devices;
when the first device of the plurality of devices is not the destination of the HT protocol packet, modifying the HT protocol packet without alteration of destination information of the packet to include source information that identifies the first device of the plurality of devices and forwarding the HT protocol packet to the host device via another upstream point-to-point link of the daisy chain supporting HT protocol communications.

18. The method of claim 17, further comprising:
when the first device of the plurality of devices is not the destination of the HT protocol packet, determining whether the destination of the HT protocol packet is within an upstream address range associated with the another upstream point-to-point link of the daisy chain supporting HT protocol communications.

19. The method of claim 17, further comprising:
when the first device of the plurality of devices is not the destination of the HT protocol packet, determining whether the destination of the HT protocol packet is within a downstream address range associated with a downstream point-to-point link of the daisy chain supporting HT protocol communications.

20. The method of claim 19, further comprising:
when the destination of the HT protocol packet is within a downstream address range associated with a downstream point-to-point link of the daisy chain supporting HT protocol communications, transmitting the packet on the downstream point-to-point link of the daisy chain supporting HT protocol communications.

* * * * *